(12) United States Patent
Schöck et al.

(10) Patent No.: US 8,187,526 B2
(45) Date of Patent: May 29, 2012

(54) METHOD AND DEVICE FOR OPERATING A CHANGE CONVERTER UNIT OF AN OXYGEN STEEL-MAKING PLANT

(75) Inventors: Hans-Wilhelm Schöck, Duisburg (DE); Guido Kleinschmidt, Moers (DE); Lars Meier, Duisburg (DE)

(73) Assignee: SMS Siemag Aktiengesellschaft, Dusseldorf (DE)

( * ) Notice: Subject to any disclaimer, the term of this patent is extended or adjusted under 35 U.S.C. 154(b) by 176 days.

(21) Appl. No.: 12/448,226

(22) PCT Filed: Dec. 13, 2007

(86) PCT No.: PCT/EP2007/010952
§ 371 (c)(1),
(2), (4) Date: Aug. 31, 2009

(87) PCT Pub. No.: WO2008/086869
PCT Pub. Date: Jul. 24, 2008

(65) Prior Publication Data
US 2010/0025899 A1 Feb. 4, 2010

(30) Foreign Application Priority Data
Jan. 20, 2007 (DE) .......................... 10 2007 003 029

(51) Int. Cl.
*C22B 5/00* (2006.01)

(52) U.S. Cl. ............. 266/44; 266/143; 266/246
(58) Field of Classification Search .............. 266/44, 266/143, 243, 246, 281
See application file for complete search history.

(56) References Cited

U.S. PATENT DOCUMENTS

| 3,411,764 A | 11/1968 | Falk et al. |
| 3,469,832 A | 9/1969 | McCready et al. |
| 3,718,265 A * | 2/1973 | Trost .............................. 414/663 |
| 4,254,711 A * | 3/1981 | Langlitz et al. ................ 105/177 |

FOREIGN PATENT DOCUMENTS

| AT | 406 383 | 4/2000 |
| GB | 979 786 | 1/1965 |

* cited by examiner

*Primary Examiner* — Scott Kastler
(74) *Attorney, Agent, or Firm* — Lucas & Mercanti, LLP; Klaus P. Stoffel

(57) ABSTRACT

A method for operating a change converter unit of an oxygen steel-making plant, in which, for the change process, a worn converter, including the entire converter unit, made up of not only the converter, but also the converter carriage, carrier ring, tilting drive, bottom flushing device and, if present, a carrier ring cooling device, is moved out of the steel-making stand into an empty delivery and waiting stand for repair, and, at the same time, a further structurally identical complete converter unit, made up of a repaired, ready-to-use converter, is moved from a further delivery and waiting stand into the steel-making stand.

8 Claims, 1 Drawing Sheet

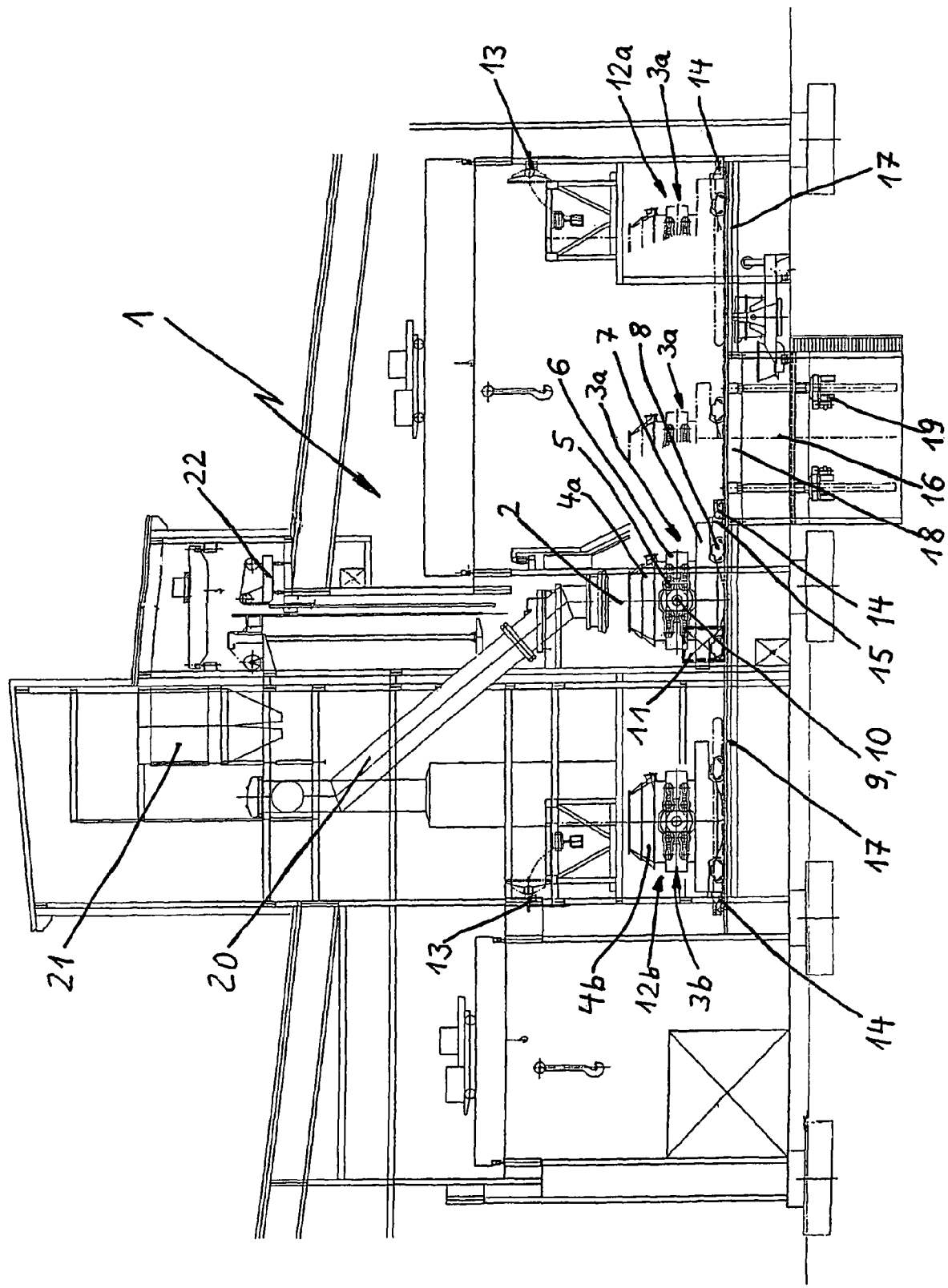

METHOD AND DEVICE FOR OPERATING A CHANGE CONVERTER UNIT OF AN OXYGEN STEEL-MAKING PLANT

BACKGROUND OF THE INVENTION

The invention relates to a method and a device for operating a changing converter unit of a converter steel plant, wherein the converter which has become useless due to wear of the refectory material is alternatingly removed for repairs from the converter stand and a converter newly equipped with refractory material is placed in the converter stand in an exchange.

Converters for steel production have a refectory lining which is subjected to high wear due to the high temperatures produced during the blowing process and because of the molten steel and slag. Therefore, it is necessary to replace these refractory linings at intervals. For this purpose, the worn converter is removed from the converter stand and is repaired as required in a repair stand. During this time, the steel production is continued with a second converter having a refectory lining without any defects. Different concepts are known for carrying out this exchange of this worn converter for a useful converter in a changing converter unit. For example, in an essay "Einjährige Erfahrung mit Wechselkonvertern bei Mannesmannröhren-Werke AG im Hüttenwerk Huckigen" [Single year experience with changing converters at Mannesmannröhren-Werke AG in the Hüttenwerk Huckigen] Stahl u. Eisen 104 (1984) Nr. 19, pages 969-976 wherein the converter consists of two converter stands with fixedly mounted support rings, three exchangeable converter vessels, a changing carriage, a break-out stand and a repair stand and a holding stand. The sequence of the changing process which becomes necessary at one of the two converter stands when the converter vessel is worn out, is carried out as follows:

The changing carriage travels under the converter stand of the converter to be exchanged. A lifting platform on the changing carriage receives the converter vessel and lowers it after the separation of the clamping elements from the support ring. The changing carriage now moves the converter vessel to the free break-out and repair stand and lowers it at that location with its lifting platform onto cantilever beams. Subsequently, the changing carriage travels to the holding carrier, receives the newly lined converter vessel which is waiting for its use and has been intermediately stored, and transports it to the free converter stand where it is raised with the lifting platform into the support ring. If the changing processes can be carried out quickly, this means that the same capacity is achieved for the melting area as in a conventional steel plant with three converters.

Austrian Patent AT 406 383 B discloses a changing converter unit consisting of a converter stand, at least two receiving stands as well as conveying means for the converter movable between the converter stand and the receiving stands, wherein at least one receiving stand is constructed so as to be movable transversely of the travel direction of the conveying means. The receiving stands are equipped as holding stands and at the same time also as lining stands. In this known changing converter unit, the changing process is carried out as follows:

Initially, the conveying means constructed with a lifting device and a carrying device for the conveying means is moved into the converter stand underneath the worn converter and this worn converter is pressed with the lifting device out of the support ring. Subsequently, the converter is transported to a receiving stand and is placed therefore for repairs. A receiving stand equipped with lined useful converter, which then acts as a receiving stand, is moved at a right angle relative to the travel direction of the conveying means to such an extent that the empty conveying means pick up the repaired converter, convey it to the converter stand and place the converter stand in the support ring.

Moreover, in the brochure H2/305E 1000/06/03 Ky of the company SMS DEMAG AG "Process lines for stainless steel production" changing converter units with AOD converters in novel steel works are described in which, after existing fasting and media supply means have been separated, the converter vessel is exchanged by means of a crane which lifts it out of the closed support ring and lowers it onto a changing carriage. Alternatively, the support ring is U-shaped and the converter vessel is then initially pushed out with a changing carriage having a lifting device.

In the described method differing methods it must be considered a disadvantage that in all methods initially the connection between the converter vessel and the support ring must be separated and then a complicated changing carriage equipped with a lifting device must be used or, in the event of a change from AOD converters in novel steel works, the crane capacity limits or reduces the possibility of carrying out the method.

SUMMARY OF THE INVENTION

Starting from the prior art described above, it is the task of the invention to provide a method and a device in which a production loss due to the placement of new linings or the converter change is reduced to a minimum and, independently therefrom, the crane capacities which are existing or to be newly installed are not subjected to any limits. The mentioned task is solved in the operation of a changing converter unit of a converter steel plant of the above-described type by using the features of claim 1, in that during the changing process the worn converter including the entire complete converter unit, consisting in addition to the converter of the converter carriages, support ring, tilting drive, floor rinsing device and a possibly existing support ring cooling device, is moved from the converter stand for repairs into a free lining and holding stand and simultaneously another structurally identical complete converter unit, which contains a repaired useful converter is moved from another lining and holding stand into the converter stand.

As a result of the feature of the invention, according to which not only the worn converter vessel is replaced when an exchange is necessary, but the entire complete converter unit is replaced for which purpose the complete converter unit is constructed so as to be movable, the necessary exchange can be carried out with a minimum of required time because a single removal of the converter vessel from the complete converter unit and the steps necessary for this purpose are no longer required and also the transportation of the converter vessel with a changing carriage or a crane are not necessary. Compared to a conventional steel mill with a classic one of two manners of operation (one converter in operation—one converter stand by) the investment costs are reduced by about 50%.

In accordance with the invention, the convection stand as well as a central energy and media station are arranged between two lining and holding stands which are connected to each other and, thus, also to the converter stand through a converter carriage track. The necessary exchange of the complete converter unit by means of the integrated converter carriage is carried out through this converter carriage track. Since the converter stand is arranged between the two lining and holding stands, this exchange can be carried out almost simultaneously because, while the worn converter with its complete unit is removed from the converter stand, a new converter can be moved in already from the other side.

In the two lining and holding stands in which the worn converter is newly lined and the complete converter units which are then again ready for use are in a holding position, preheating devices are arranged which makes possible a quick drying of the new refractory lining and furthermore a heating of the converter prior to its subsequent use in the converter stand.

For operating the converter in the converter stand, the complete converter unit is connected through appropriate lines to the central energy and media station which are utilized simultaneously by the two converters. Therefore, when the exchange procedure is carried out, it is necessary to separate the complete converter unit containing the worn converter from this central energy and media station, and, after the complete converter unit with a new converter has been exchanged, this energy and media station is reconnected to this central energy and media station for a continuous operation.

In order to make it possible that after the separation from the central energy and media station to transport the complete converter unit, an advantageous further development of the invention has equipped the converter carriages with a separate drive, wherein, for supplying energy to the drive, a self-propelled energy supply carriage is moved over the converter carriage track against the converter carriage and is coupled thereto. After the complete converter units have been moved to their destinations (convection stand and lining and holding stand), the energy supply carriage is once again removed from the converter carriage.

Depending on the arrangement of the converter in the steel mill, there may be the requirement that the existing logistical conveying paths within the steel mill are not impaired. In order to meet this requirement, a partial track which intersects the existing logistical tracks of the steel mill of the otherwise stationary converter carriage track is used as required, or is moved by a special track lifting device onto or below the mill floor.

Further details, features and advantages of the invention will be explained in more detail below with the aid of an embodiment illustrated in a schematic drawing FIGURE in connection with an example of a carried-out exchange.

BRIEF DESCRIPTION OF THE DRAWING

The single FIGURE is a schematic illustration of the invention.

DETAILED DESCRIPTION OF THE INVENTION

The embodiment of a changing converter plant 1 illustrated in the drawing consists essentially of a converter stand 2 with low lance device 22, material handling system 21 and dust removal unit 20 which is arranged between two lining and holding stands 12a, 12b. Both lining and holding stands 12a, 12b are connected to each other and to the converter stand 2 by a converter carriage track 17, wherein a partial track 18 is constructed so as to be lowerable by means of a track lifting device on a logistic transport path 16 for reasons of steel mill logistics.

A complete converter unit 3a which is to be replaced is in the converter stand 2. The complete converter unit 3a, which contains the worn converter 4a, additionally consist of a tilting drive 5, the support ring 6 with a support ring cooling device 10, the converter carriage 7 with converter carriage drive 8 and a floor rinsing device 9.

For carrying out an exchange, this complete converter unit 3a is initially separated from the central energy and media supply 11 located in the vicinity of the converter stand 2. Subsequently, an energy supply carriage 14 which is provided with its own drive and travels on the converter carriage track 17 is moved into the coupling position 15 of the converter carriage 7; the lining and holding stand 12a (located to the right of the converter stand 2 in the drawing) which is "parked" in the lining and holding stand 12a. The energy supply for the converter carriage drive 8 is then coupled. The complete converter unit 3a can now be moved with its own drive 8 into the free lining and holding stand 12a. In the drawing, the track from the converter stand 2 to the lining and holding stand is illustrated by individual "hinted" positions of the complete converter unit 3a. Once arrived in the lining and holding stand 12a, the worn converter 4a can be newly lined and subsequently dried by means of the preheating device 13 and can be preheated for the next use.

Simultaneously with the removal of the complete converter unit 3a, the complete converter unit 3b with newly lined converter 4b waiting for its use in the lining and holding stand 12b (to the left of converter stand 2 in the drawing) is driven with its own drive to the converter stand 2 and is there connected to the energy and media supply 11 and is ready for operation as a result.

List of Reference Numerals
1 converter plant
2 converter stand
3a complete converter unit with worn converter 4a
3b complete converter unit with newly lined converter 4b
4a worn converter
4b newly lined converter
5 tilting drive
6 support ring
7 converter carriage
8 converter carriage drive
9 floor rinsing device
10 support ring cooling device
11 central energy and media supply
12a, 12b lining and holding stand
13 preheating device
14 energy supply carriage
15 coupling position
16 logistic track
17 converter carriage track (stationary)
18 partial track (lowerable and insertable)
19 track lifting device
20 dust removal unit
21 material handling system
22 blow lance unit

We claim:

1. Method of operating a changing converter unit (1) of a converter steel plant, wherein alternatingly the converter (4a) which has become useless because of wear of the refractory material is removed from a converter stand for repairs and a converter (4b) newly lined with refractory material is placed in the converter stand in an exchange, wherein, when the exchange procedure is carried out, the worn converter (4a) is moved including the entire complete converter unit (3a) composed, in addition to the converter (4a), of an integrated converter carriage (7), support ring (6), tilting drive (5), floor rinsing device (9) and a possibly present support ring cooling device (10), from the converter stand (2) for repairs into a free lining and holding stand (12a) and simultaneously another structurally identical complete converter unit 3b, which contains a repaired useful converter (4*b*), is moved from another lining and holding stand (12*b*) into the converter stand (2), wherein the transport of the complete converter unit (3*a*, 3*b*) is carried out by means of the integrated converter carriage (7) constructed with its own drive on a converter carriage track (17), wherein, after separating the complete converter unit (3*a*, 3*b*) from an energy and media station (11) which is used jointly by both complete converter units (3*a*, 3*b*), for providing an energy supply for the transport a self-propelled energy supply carriage (14) is moved in and coupled to the converter carriage (7) through the converter carriage track (17).

2. The method according to claim 1, wherein after the repairs have been carried out, the converter (4*a*) is preheated in the lining and holding stand (12*a*) until it is used.

3. Method according to claim 1, wherein a partial track (18) which intersects the existing logistical transportation tracks of a steel mill is utilized as necessary or is moved onto or underneath the floor of the mill by means of a track lifting device (19).

4. Changing converter unit (1) of a converter steel mill, in which a converter (4*a*) which has become useless because of wear of refractory material is removed from the converter stand for repairs and a converter (4*b*) newly lined with refractory material is placed in the converter stand in an exchange, for carrying out the method of claim 1, comprising
   a) two lining and holding stands (12*a*, 12*b*) arranged at a distance from each other,
   b) a converter stand (2) arranged between the lining and holding stands (12*a*, 12*b*),
   c) and a complete converter unit (3*a*, 3*b*) constructed so as to be movable between the converter stand (2) and a lining and holding stand (12*a*, 1215), wherein each complete converter unit (3*a*, 315) is composed of the converter (4*a*, 415), and of converter carriages (7), support ring (6), tilting drive (5), floor rinsing device (9), and a possibly provided support ring cooling device (10), wherein the converter carriages (7) are self-propelled and equipped with thereon converter carriage drive track (8), and for providing the converter carriage drives (8) with energy, the converter carriages (7) are constructed with a coupling device for self-propelled energy supply carriages (14).

5. Changing converter plant (1) according to claim 4, wherein a central energy and media station (11) is arranged in the vicinity of the converter stand (2) and the converters are coupled to the converters (4*a*, 4*b*) for the operation and are uncoupled for the exchange.

6. Changing converter plant (1) according to claim 4, wherein the two lining and holding stands (12*a*, 12*b*) are connected to one another through a converter carriage track (17).

7. Changing converter plant (1) according to claim 6, wherein a partial track (18) of the otherwise stationary converter carriage track (17) is constructed so as to be lower able and usable.

8. Changing converter plant (1) according to claim 4, wherein the lining and holding stands (12*a*, 12*b*) include a pre-heating device (13) for preheating the freshly lined converter (3*a*, 3*b*).

* * * * *